United States Patent [19]

Bolt

[11] 3,908,845

[45] Sept. 30, 1975

[54] MATERIALS HANDLING EQUIPMENT MORE PARTICULARLY A COMBINATION CYLINDRICAL PIPE HANDLE AND HOIST MOUNTING DEVICE

[76] Inventor: Alex W. Bolt, 1408 Richmond, Apt. 255, Houston, Tex. 77006

[22] Filed: Oct. 26, 1973

[21] Appl. No.: 410,213

[52] U.S. Cl. ............. 214/147 R; 214/1 P; 214/620; 214/DIG. 3; 294/86 R
[51] Int. Cl.² .......................................... B66F 9/18
[58] Field of Search ..... 294/67 R, 67 C, 86 R, 86.1, 294/90, 91, 92, 93–97; 214/1 P, 1 PA, 2.5, 620, 147 R, DIG. 3

[56] References Cited
UNITED STATES PATENTS

| | | | |
|---|---|---|---|
| 2,684,164 | 7/1954 | Violette | 214/620 |
| 2,687,226 | 8/1954 | Garrett | 294/97 X |
| 3,041,089 | 6/1962 | Purves | 294/93 X |
| 3,491,427 | 1/1970 | Zimmerman et al. | 294/97 X |
| 3,705,658 | 12/1972 | Harris | 214/620 |

*Primary Examiner*—Evon C. Blunk
*Assistant Examiner*—Johnny D. Cherry
*Attorney, Agent, or Firm*—Kenneth H. Johnson

[57] ABSTRACT

The disclosure is of a combination cylindrical pipe handle and hoist mounting device for use in lifting and handling joints of large diameter pipe. With the hoist mounting device inserted into the cylindrical pipe handle that may be of various diameters or which may be of one diameter for use as an inseparable item from the same hoist mounting device, applicable hoisting equipment may be applied to the mounting device, permitting the cylindrical pipe handle to be firmly inserted into an open end of a large diameter pipe, longitudinally engaging the inside wall of a pipe section and the cylindrical pipe handle with close tolerance, thus permitting vertical lifting and horizontal handling of the pipe.

1 Claim, 5 Drawing Figures

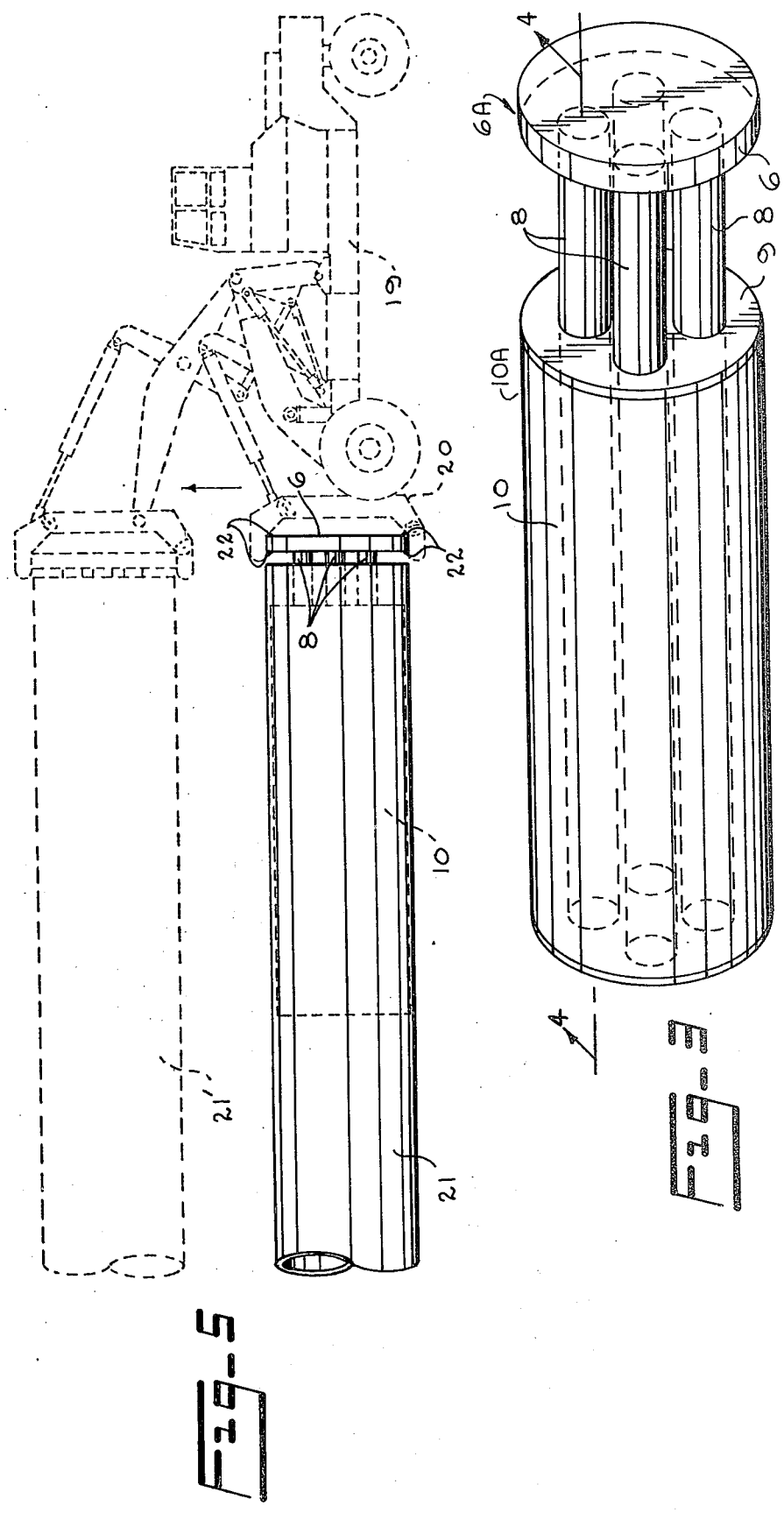

MATERIALS HANDLING EQUIPMENT MORE PARTICULARLY A COMBINATION CYLINDRICAL PIPE HANDLE AND HOIST MOUNTING DEVICE

SUMMARY OF MY INVENTION

This invention relates to materials handling equipment and more particularly to a combination pipe handle and hoist mounting device with handle extendable for a length into, and to fit with close tolerance within, a large diameter pipe section to be handled, the outer member or flange of the handle being adapted to have conventional hoisting apparatus connected thereto, and the hoisting apparatus, as thus engaged, being able to handle the pipe section, as to a lifted position, or to any desired position.

STATE OF THE ART

A great deal of difficulty has been experienced in lifting and handling joints of large diameter pipe. This difficulty arises both from the inherent size and weight of the pipe and also from the very stringent pipe manufacturing specifications. These specifications normally require a high degree of structural roundness and finitely tooled pipe end edges or bevels. For various reasons, large diameter pipe are generally manufactured at points far away from the location at which the pipe will be ultimately used or installed. Consequently, the pipe must be transported from the place of manufacture to the installation point thereby causing the pipe to be lifted and handled a number of times due to interim storage requirements, loading, shipping, unloading and final stringing along the pipeline route. In order to retain the structural integrity of the pipe between the point of manufacture and final destination, lifting and handling of these large diameter pipe must be accomplished very meticulously by exercising a high degree of care and diligence, as to prevent abrasion, denting or bending the pipe in handling.

Techniques, equipment and related devices most commonly used today are very time consuming, expensive and dangerous. Currently, the most practicable means of lifting and handling large diameter pipe requires the use of overhead and/or mobile hoisting cranes equipped with swinging cable apparatus with pipe end hooks and/or pipe end clamps plus the corresponding complement of personnel to include a general superintendent for supervising the pipe operations, a crane operator for operating the hoisting equipment, two general helpers for connecting the pipe end hooks and/or pipe end clamps to each end of the pipe, a quality control inspector to assure the lifting and handling is accomplished with minimum damage, and a safety inspector to assure the effort is performed in accordance with applicable safety precautions.

When the pipe end hooks and/or pipe end clamps are fastened to the joint of pipe, it is lifted by the hoisting crane and moved, during which time the pipe is suspended by the cable apparatus and manually must be guided and controlled by ropes attached to each end of the pipe. Inevitable human error on the part of the hoisting crane operator and/or faulty hoisting equipment, cable apparatus or hook ups, often create hazardous working conditions for personnel at or near this operation. These factors also increase the time required for lifting and handling each joint or section of pipe. The applicant has conducted a thorough search of recent Official Gazettes covering the years since the problem has become so important and has found no patents of pertinency.

OBJECTS OF MY INVENTION

An object of the invention is to provide a new and useful cylindrical pipe handle of respective various sizes and capacities to be used for lifting and handling large diameter sizes of pipe in a way so as to reduce costs associated therewith through increased productivity resulting from faster lifting and handling techniques, requirement for fewer personnel able to perform more units of work, and overall safer working conditions and environment.

Another object of my invention is to provide a cylindrical pipe handle hoist mounting device with which conventional hoisting equipment may be readily engaged, thus to permit faster, safer and more overall economical hoisting techniques required in the lifting of, and handling of, large diameter pipe.

Still another object of the invention is to provide a pipe handle assembly of flange connected, parallel extending rods, inserted into respective tubular, rod receiving members spaced radially inwardly from the cylindrical member which fits with close tolerance within a pipe section to be lifted or handled, a fibrous and/or plastic material filling with some substantial rigidity, the interspaces between tubular members, and between tubular members and cylindrical member.

Other objects, and a further understanding of my invention may be had by referring to the following description and claims taken in conjunction with the accompanying drawings in which:

FIG. 3 is a view, in general correspondence with FIG. 2, but with the aforesaid flange being shown, that mounts the rods, and ties them together.

FIG. 5 is an elevational view, showing the combination cylindrical pipe handle and hoist mounting device, as engaged by conventional materials handling apparatus, (shown in broken lines), being shown inserted into a section of pipe; the pipe section being shown in first engaged, and then in lifted position, the handle cylinder bearing such proportion to the total length of the pipe section, that the pipe section, as lifted is shown substantially parallel to its position, as first engaged by the hoisting apparatus.

Figure 1:
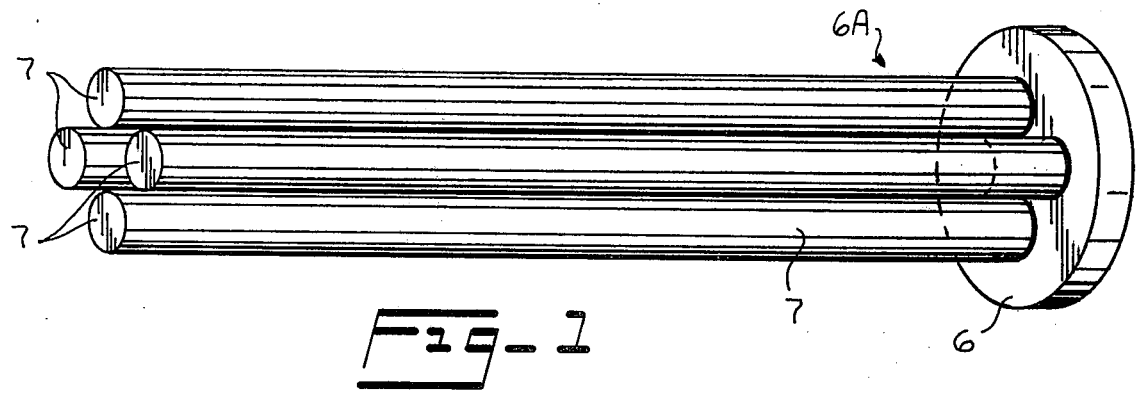
FIG. 1 is an isometric view of the pipe handle part with which conventional hoisting apparatus may be engaged, in particular with the outer end flange that rigidly mounts the parallel extending rods.
Figure 2:
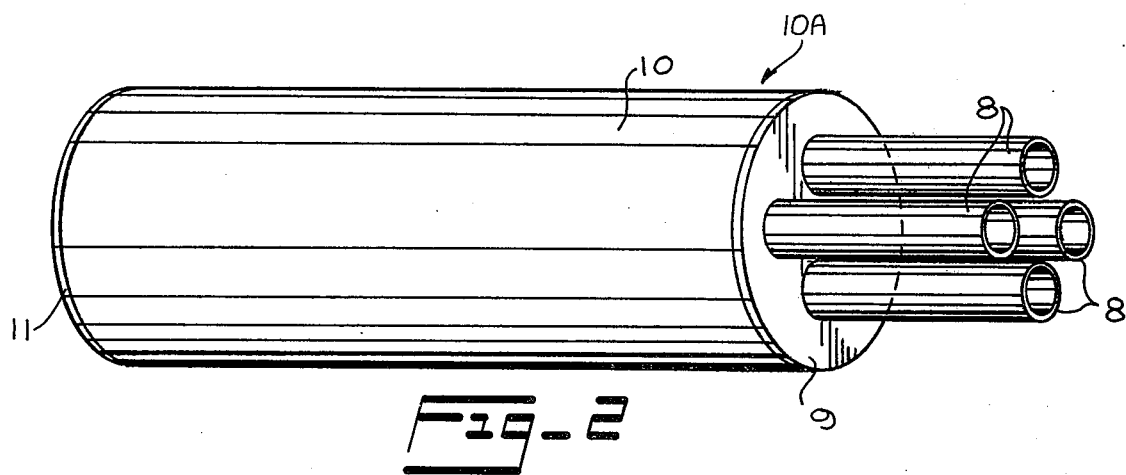
FIG. 2 is an isometric view of the handle cylinder, or cylindrical member, which extends with slight tolerance within the pipe section to be handled, the tubes which slidably receive the rods therein to extend slidably, parallel into the handle cylinder being shown with their outer end connected flange being omitted.

With reference to the drawings, the complete invention is best shown in FIG. 3 and comprises a combination cylindrical pipe handle and hoist mounting device, to be hereinafter described:

The hoist mounting device assembly 6A is shown in FIG. 1 as comprised of parallel extending rods 7 tied together at their outer end by rigid connection to the flange 6. The handle assembly 10A is shown in FIG. 2 as comprised of an outer, cylindrical member with closed inner end 11 and closed outer end 9; with the tubular members 8, which receive the hoist mounting device rods 7, being shown extending rigidly, and in parallel, from the outer end of the handle assembly 10A. FIG. 3 shows the assembly of the invention 6A and 10A, when the rods 7 have been inserted into the respective tubular members 8. In the cross-sectional, fragmentary view of FIG. 4, details of construction are shown, whereby the outer end of the rods 7 are both press-fitted into the inner face of the flange 6 and also welded thereto by welding material 18. Also, in this view it is shown that the respective outer and inner closure plates 9 and 11 are welded to the cylindrical member 10, which they close, by respective welds 15, 14. Also the inner ends of the tubes 8 are shown welded to the inner closure plate 11 by welds 16, the outer ends of the tubes 8 are shown welded to the outer closure plate 9 by welds 17.

Figure 4:
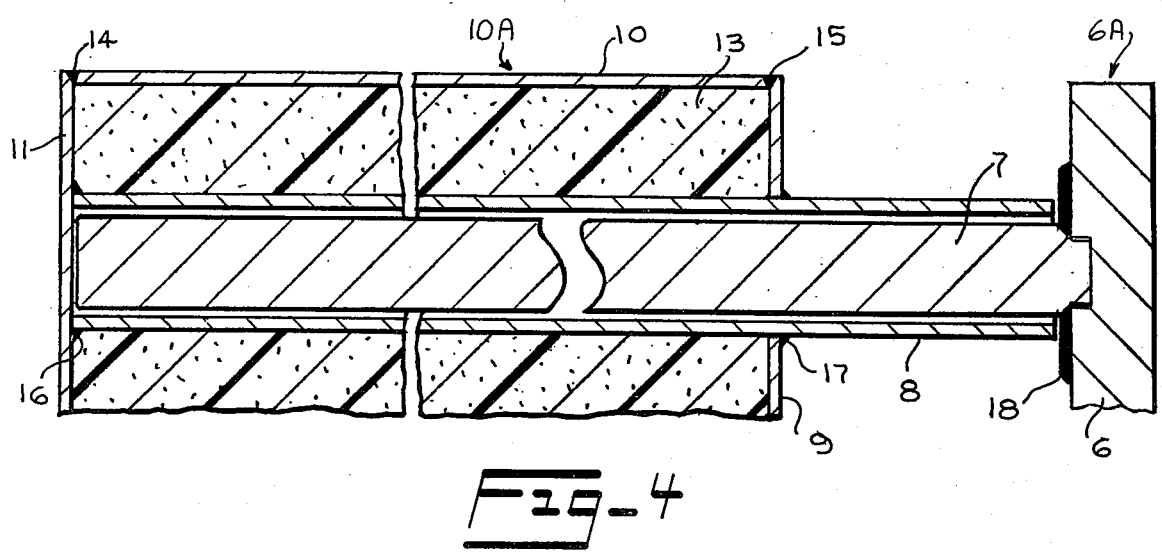
FIG. 4 is an enlarged cross-sectional view, taken along Line 4—4 on FIG. 3, showing particularly a view of the hoist mounting device with its rods inserted into the cylindrical pipe handle; this view also showing the primary structural supporting substance, filler and spacer, as consisting of plastic, and/or a fibrous composite material.

A plastic and/or fibrous material 13 is shown in cross-section in FIG. 4, as filling the interspaces between tubes 8, and the interspaces between tubes 8 and cylindrical member 10. This material may preferably be comprised of a glass reinforced fiber material 13, of relatively light weight, but of substantial strength and rigidity.

The cylindrical pipe handle tubular members 8 are made from conventional steel casing which is cut into the desired lengths. These steel tubular members 8 are then welded to the closed inner end plate 11 by welds 16. The outer end 9 is then slipped over the ends of the tubular members 8 and welded 17 to the tubular members. The glass reinforced fiber composite material 13 used for the primary structural component of the cylindrical pipe handle is now applied. Preferably a mold is used for inserting the skeleton cylindrical pipe handle consisting of the inner end 11 tubular members 8 and outer end 9 in which the fiber reinforced composite material 13 is placed around the tubular members 8 and the entire distance between the outer end 9 and inner end 11 to the desired diameter of the cylindrical pipe handle controlled by the pre-selected mold, always leaving the required space around which to affix the outer wall 10 which may consist of either glass reinforced fibrous material of high tensile strength or a thin sheet of rolled plate steel that is capable of being welded 15 to the pipe handle outer end 9 and inner end 11 by weld 14 with conventional bonding or welding techniques whichever is suitable for the material selected for the outside wall 10 of the cylindrical pipe handle. The high tensile structural integrity and compressive strength capability of my pipe handle rests primarily on the fiber-plastic composite materials 13 used as the supporting substance within the pipe handle. The outside cylindrical wall 10, outer end plate 9 and inner end plate 11 of the pipe handle are primarily used for protection of the selected composite material 13. Various methods, combinations and types of fibers, plastics and resins may be employed in constructing the cylindrical pipe handle.

The overall lifting and compression requirements of the particular cylindrical pipe handle determines which materials and methods are to be used. Fiber reinforced composite materials give high tensile strength and relatively light characteristics for ease in handling and otherwise using the combination cylindrical pipe handle and hoist mounting device.

With further reference to FIG. 4, the complete hoist mounting device comprises a high tensile strength steel flange 6 and also high tensile strength steel rods 7 which are affixed to the steel plate 6 preferably by conventional welds 18 that are also used for spacers between the pipe handle and hoist mounting device flange 6. Preferably the affixing of the steel flange 6 to the steel rods 7 is by conventional welding techniques; however, the hoist mounting device, may use either a continuous steel forged molding process or a combination of these techniques and processes. The steel rods 7 are preferably arranged of equal distance between each of the steel rods 7 and the circumference of the flange 6. The steel rods 7 are rigidly attached to the steel plate 6 for insertion slidably into the cylindrical pipe handle open cylinders 8.

The detailed steps in using the invention may now be described. The hoist mounting device, FIG. 1, is attached to a conventional item of materials handling equipment 19, FIG. 5, at the appropriate point 20, by use of conventional welding 22. When the hoist mounting device is attached to the conventional item of handling equipment 19 the steel rods 7 are aligned and inserted into the pipe handle tubular members 8 to the point where the tubular members 8 are in contact with the steel rod welds 18 that connect the steel rods 7 to the flange 6.

By use of the item of equipment 19, and the hoist mounting device, on which the pipe handle has been connected, the pipe handle is inserted snugly into a joint of pipe 21 as shown as FIG. 5. The outside wall 10 of the pipe handle and inside wall of the joint of pipe 21 comes into contact at such time as the hoisting equipment 19 causes the lifting mechanism 20 to lift the attached hoist mounting device thereby creating the required amount of linear friction inside the joint of pipe to permit rigid control of the pipe 21 for lifting and handling by the item of equipment 19.

Engineering calculations have determined the overall lengths and diameters of the pipe handles, especially as to their lengths, that will be necessary to support and effect lifting and handling of the various diameters, lengths and weight of the pipe to be moved. Generally, the use of the same hoist mounting device may be used with various sizes of pipe handles. It is not my intent, however, to preclude the use of various sizes of hoist mounting devices to include various sizes of flanges 6 for adaptation to the conventional item of materials handling equipment, nor is it my intent to preclude the use of the combined hoist mounting device and cylindrical pipe handle as one independent device as may be made as one device with the outside cylindrical member 10 being made of any and all diameters for use with joints or sections of large diameter pipe. Specifically, both the hoist mounting device and cylindrical pipe handle could be made as one device and of various cylindrical member 10 diameters and flange 6 diameters. Instead of having slidable connecting characteristics, the device would be of singular connected form at the time of manufacture.

Although the invention has been described with a certain degree of particularity, it is understood that the present disclosure has been made only by way of example and that numerous changes in the details of fabrication, construction and the combination arrangement, types of materials and component parts may be resorted to without departing from the spirit and the scope of the invention as hereinafter claimed.

I claim as my Invention:

1. A pipe handling apparatus comprising in combination, a hoisting and lifting apparatus, a hoist mounting device which comprises a flange having a plurality of parallel rods connecting to and extending therefrom, means for rigidly connecting said flange to said hoisting and lifting apparatus, and a cylindrical pipe handle which comprises a cylindrical body member having an inner end closure and an outer end closure, a plurality of parallel tubes passing through said outer end closure and connected to said inner end closure, said tubes being arranged and adapted to slidably mount on to said rods.

* * * * *